July 27, 1926.
T. V. BUCKWALTER
RAILWAY CAR AXLE
Filed March 6, 1926
1,594,148
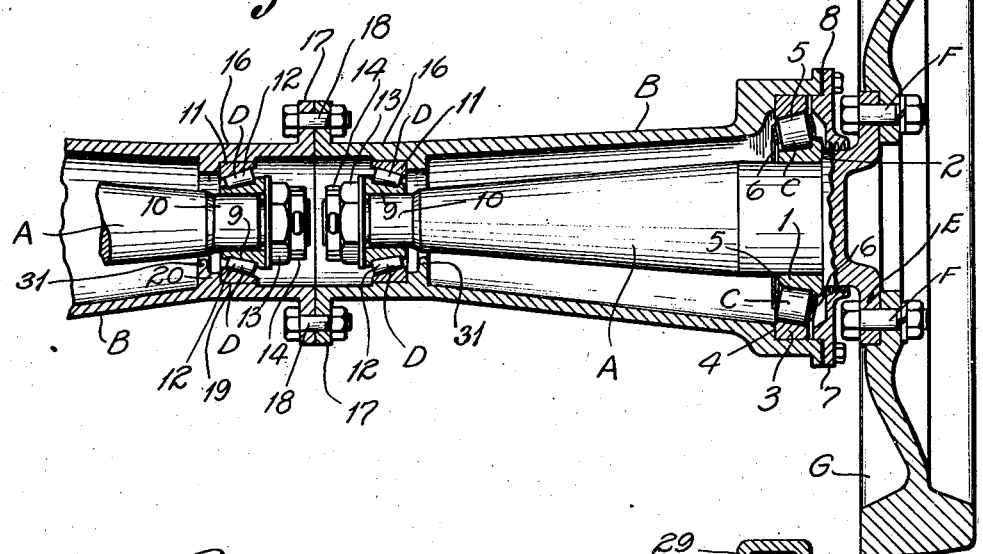
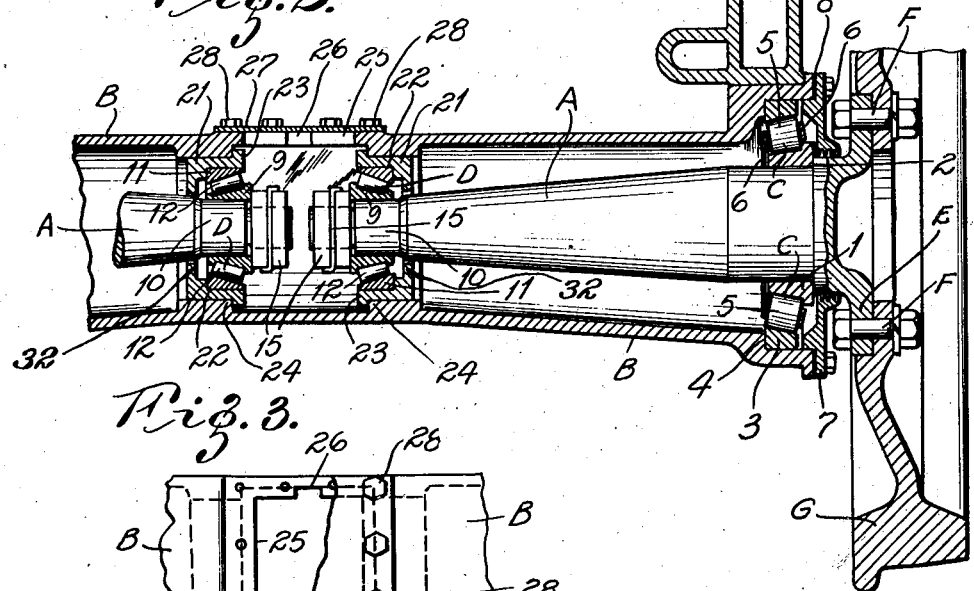
INVENTOR:
Tracy V. Buckwalter,
by his ATTORNEYS.

Patented July 27, 1926.

1,594,148

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR AXLE.

Application filed March 6, 1926. Serial No. 92,665.

My invention relates to railway car axles and has for its principal objects to reduce the weight of such constructions, to permit differential action of the wheels and to provide a construction which is simple and economical and which is easy to assemble and to dismount for repair or other purposes. The invention consists principally in a sectional axle supported by roller bearings in a housing, said axle sections having flanged outer ends to which are secured annular wheel members. The invention further consists in the railway car axle and in the parts and combinations and arrangements of parts hereinafter described and claimed.

In the accompanying drawing, wherein like reference characters indicate like parts wherever they occur:—

Fig. 1 is a longitudinal sectional view of somewhat more than half of a railway car axle embodying my invention, the omitted portion being similar to the portion fully illustrated;

Fig. 2 is a similar sectional view of a slightly modified form of the invention; and Fig. 3 is a detail plan view showing the opening in the top portion of the axle housing shown in Figure 2 and the cover therefor.

Counterpart axle sections A are mounted in an axle housing B, conical roller bearings C being interposed between the ends of the axle sections A and the ends of the housing B and conical roller bearings D being also interposed between the inner ends of the axle sections and the middle portion of the housing B. The outer end of each axle section is provided with an annular flange E to which is secured, as by bolts F, an annular wheel member G.

The roller bearings C at the outer ends of the axle sections A comprise cones 1 or inner bearing members abutting against shoulders 2 on said axle sections A, cups 3 or outer bearing members mounted in the ends of the axle housing B and abutting against shoulders 4 therein, conical rollers 5 interposed between said cups 3 and cones 1, said rollers 5 being disposed with their large ends outward, and cages 6 for retaining the rollers on the inner bearing members. End closure rings 7 are provided for the ends of the axle housing, gaskets 8 being preferably interposed between the rings 7 and the ends of the housing.

The conical roller bearings D interposed between the inner ends of the axle sections A and the housing B comprise cones 9 mounted on the reduced end portions 10 of said axle sections A, cups 11 supported in the housing and conical rollers 12 interposed between the cups and cones, said conical rollers being disposed with their large ends toward each other, that is, with their small ends toward the outer ends of the axle. The inner bearings D are adjusted by moving the cones 9 thereof endwise on the axle; and means are provided for holding said cones 9 in position, a nut 13 and lock washer 14 being shown in Figure 1 and a somewhat different form of lock nut 15 being shown in Figure 2.

In the construction shown in Figure 1, the axle housing B comprises counterpart sections 16 having annular flanges 17 at their meeting ends secured together, as by bolts 18. The bearing cups 11 are mounted in seats 19 provided therefor, as by machining, in the inner ends of the housing sections, each cup abutting against an annular rib 20 in the housing.

In the construction shown in Figure 2, separate members 21 are mounted in the middle portion of the housing B to support the bearing cups 11, said cup supporting members 21 having seats 22 in which said cups fit. Said cup supporting members have annular end ribs 23 that fit against rib portions 24 of the housing.

The axle housing shown in Figures 2 and 3 has a central opening 25 in the top thereof, permitting tools to be inserted to adjust the bearings D and also permitting greasing and inspection of the parts. On opposite sides of said opening 25 are notches 26 permitting the cup supporting members 21 to be introduced into the housing. A cover plate 27 is provided for said opening and secured thereto as by screws 28.

The truck side frames 29 rest on the ends of the axle housing B above the outermost roller bearings C.

Suitable lubricant is provided for the bearings C and D. The bottom portion of the housings B shown in the drawings slopes downwardly toward each end, so that the lubricant for the outer bearings C accumulates in the end portions of the housing.

Suitable means are provided for forming a lubricant chamber for the inner bearings D. In the construction shown in Fig. 1, each axle section 16 has an upstanding rib 31 extending around a portion of its periphery, the two ribs 31 thus forming between them a lubricant retaining chamber. In the construction shown in Fig. 2 each cup supporting member is provided with an annular flange 32 at its outer end, said flange 32 forming the lubricant retaining chamber.

The above described railway car axle construction has numerous advantages. It is much lighter than ordinary axles, both by reason of its sectional construction and the tapering of the axle sections, and by reason of the use of annular wheel members secured to the end flanges of the axle sections. End thrusts are taken up entirely by the outer sets of roller bearings, thus leaving the inner bearings to carry only radial load. All of the bearings may easily be adjusted and it is easy to inspect the parts and to remove any parts for repair or replacement. In a construction such as shown in Fig. 1, it is easy to remove one-half of the axle construction (including one axle section and its sectional housing member) without disturbing the other part of the axle construction. In the construction shown in both figures, either axle section may be removed independently of the other axle section. Obviously, numerous changes may be made without departing from the invention and I do not wish to be limited to the precise construction shown.

What I claim is:—

1. A railway car axle construction comprising an axle housing, axle sections therein each of said axle sections having a flange at its outer end, an annular wheel secured to each of said flanges, and conical roller bearings interposed between the ends of said axle sections and said housing.

2. A railway car axle construction comprising an axle housing, axle sections therein and conical roller bearings interposed between the ends of said axle sections and said housing.

3. A railway car axle construction comprising an axle housing, axle sections therein and conical roller bearings interposed between the ends of said axle sections and said housing, the outer roller bearings being adapted and arranged to receive both end thrust and radial loads and the inner roller bearings being adapted and arranged to carry radial loads.

4. A railway car axle construction comprising an axle housing, axle sections therein and conical roller bearings interposed between the ends of said axle sections and said housing, the outer roller bearings being disposed with the large ends of the rolls thereof outward, and the inner roller bearings being disposed with the small ends of the rolls thereof outward.

5. A railway car axle construction comprising an axle housing, axle sections therein, conical roller bearings interposed between the ends of the axle sections and said housing and means for adjusting the bearings on the inner ends of said axle sections.

6. A railway car axle construction comprising an axle housing, axle sections therein and conical roller bearings interposed between the ends of said axle sections and said housing, the outermost roller bearings being disposed with the large ends of the rolls thereof outward, and the innermost roller bearings being disposed with the small ends of the rolls thereof outward, said housing being provided with an opening at the middle thereof.

7. A railway car axle construction comprising an axle housing, axle sections therein, conical roller bearings interposed between the ends of said axle sections and said housing, the outermost roller bearings being disposed with the large ends of the rolls thereof outward and the innermost roller bearings being disposed with the small ends of the rolls thereof outward, and supporting members for the cups of said inner roller bearings mounted on seats provided therefor in said housing.

8. A railway car axle construction comprising an axle housing, axle sections therein, conical roller bearings interposed between the ends of said axle sections and said housing, the outermost roller bearings being disposed with the large ends of the rolls thereof outward and the innermost roller bearings being disposed with the small ends of the rolls thereof outward, and supporting members for the cups of said inner roller bearings mounted on seats provided therefor in said housing, said cup supporting members having end ribs abutting against portions of said housing.

9. A railway car axle construction comprising an axle housing, axle sections therein, conical roller bearings interposed between the ends of said axle sections and said housing, the outermost roller bearings being disposed with the large ends of the rolls thereof outward and the innermost roller bearings being disposed with the small ends of the rolls thereof outward, and supporting members for the cups of said inner roller bearings mounted on seats provided therefor in said housing, said cup supporting members having end ribs abutting against portions of said housing, said housing having an opening at the middle thereof and oppositely disposed notches at edges of said opening whereby said cup supporting members and said inner roller bearings may be inserted into said housing.

10. A railway car axle construction comprising an axle housing, axle sections therein, conical roller bearings interposed between the ends of said axle section and said housing, said housing being provided with ribs at the outer ends of the innermost bearings, said ribs forming a lubricant chamber for said bearings.

11. A railway car axle construction comprising an axle housing, axle sections therein, conical roller bearings interposed between the ends of said axle sections and said housing and rib members arranged at the outer ends of the innermost roller bearings to form a lubricant chamber therefor.

Signed at Canton, Ohio, this 27 day of Feb., 1926.

TRACY V. BUCKWALTER.